United States Patent [19]
Mannava et al.

[11] Patent Number: 5,742,028
[45] Date of Patent: Apr. 21, 1998

[54] PRELOADED LASER SHOCK PEENING

[75] Inventors: Seetharamaiah Mannava, Cincinnati; William D. Cowie, Xenia, both of Ohio

[73] Assignee: General Electric Company, Cincinnati, Ohio

[21] Appl. No.: 685,647

[22] Filed: Jul. 24, 1996

[51] Int. Cl.$^6$ ...................................................... B23K 26/00
[52] U.S. Cl. .................................. 219/121.82; 219/121.84
[58] Field of Search .......................... 219/121.82, 121.84

[56] References Cited

U.S. PATENT DOCUMENTS

| | | |
|---|---|---|
| 3,566,662 | 3/1971 | Champoux . |
| 3,576,070 | 4/1971 | Parsons . |
| 3,689,176 | 9/1972 | Howell et al. . |
| 3,834,833 | 9/1974 | Faber et al. . |
| 3,850,698 | 11/1974 | Mallozzi et al. . |
| 4,002,403 | 1/1977 | Mallozzi et al. . |
| 4,060,769 | 11/1977 | Mallozzi et al. . |
| 4,401,477 | 8/1983 | Clauer et al. . |
| 4,426,867 | 1/1984 | Neal et al. . |
| 4,539,461 | 9/1985 | Benedict et al. . |
| 4,557,033 | 12/1985 | Champoux . |
| 4,687,901 | 8/1987 | Binder et al. ...................... 219/121.82 |
| 4,708,752 | 11/1987 | Kar . |
| 4,844,694 | 7/1989 | Naudet . |
| 4,934,170 | 6/1990 | Easterbrook et al. . |
| 4,937,421 | 6/1990 | Oritiz, Jr. et al. . |
| 4,972,061 | 11/1990 | Duley et al. . |
| 5,120,197 | 6/1992 | Brooks et al. . |
| 5,127,019 | 6/1992 | Epstein et al. . |
| 5,131,957 | 7/1992 | Epstein et al. . |
| 5,226,785 | 7/1993 | Narayana et al. . |
| 5,235,838 | 8/1993 | Berstein . |
| 5,306,360 | 4/1994 | Bharti et al. . |
| 5,307,622 | 5/1994 | Ciokajlo et al. . |
| 5,316,720 | 5/1994 | Spiegel et al. . |
| 5,492,447 | 2/1996 | Mannava et al. . |

OTHER PUBLICATIONS

"Laser shocking extends fatigue life", American Machinist, A Penton Publication, Jul., 1992, pp. 62–64.

"Laser Shock Processing Increases the Fatigue Life of Metal Parts", Materials and Processing Report, Sep., 1991, pp. 3–5.

"Stress Peening or Strain Peening", Metal Improvement Company, Inc., pp. Contents, 40, 41, 75.

*Primary Examiner*—Geoffrey S. Evans
*Attorney, Agent, or Firm*—Andrew C. Hess; Nathan D. Herkamp

[57] ABSTRACT

A method of laser shock peening a gas turbine engine article by loading the article such that a portion of the article to be laser shock peened is placed in a loaded condition while the portion is laser shock peened using a laser to fire a laser beam with sufficient power to vaporize material on a laser shock peening surface of the portion of the article to form a region in the portion having deep compressive residual stresses imparted by the laser shock peening process extending into the article from the laser shock peened surface. The loaded condition may be either in compression or preferably tension. The loaded article is continuously moved while continuously firing a stationary laser beam, which repeatably pulses between relatively constant periods, on a portion of the article with sufficient power to vaporize material on the surface of the portion of the article with the pulses around laser beam spots formed by the laser beam on the surface and form a region having deep compressive residual stresses extending into the article from the laser shock peened surface. Flowing a curtain of water over the surface upon which the laser beam is firing while moving the article until the laser shock peened surface is completely covered by laser beam spots at least once. The surface may coated with paint or tape which is the material used to produce the plasma or the surface may be unpainted and the metal of the article is used to produce the plasma.

9 Claims, 5 Drawing Sheets

PRELOADED LASER SHOCK PEENING

RELATED PATENT APPLICATIONS

The present application deals with related subject matter in U.S. Pat. No. 5,492,447, entitled "LASER SHOCK PEENED ROTOR COMPONENTS FOR TURBOMACHINERY" and in co-pending U.S. Patent Ser. No. 08/362,362, entitled "LASER SHOCK PEENED TURBINE ENGINES FAN BLADE EDGES", entitled "LASER SHOCK PEENING ON THE FLY", 08/399,285 entitled "LASER SHOCK PEENED GAS TURBINE ENGINE COMPRESSOR BLADE EDGES", filed December 1994, and No. 5,675,892 entitled "LASER SHOCK PEENING FOR GAS TURBINE ENGINE VANE REPAIR".

BACKGROUND OF THE INVENTION

1. Field of the Invention

This invention relates to an enhanced laser shock peening process for imparting localized compressive residual stresses by laser shock peening and, more particularly, to straining a localized region into which the compressive residual stresses are imparted by laser shock peening.

2. Description of Related Art

Turbomachinery, such as gas turbine engines and, in particular, aircraft gas turbine engines, operate rotors at high rotational speeds that subject the rotor's components to very high tensile stress fields particularly at radially outer edges of the rotors and disks. These disks are designed to operate in high tensile stress fields and often contain features that are stress risers such as annular corners between web and spacer arms of the disks which subject the components to fatigue failure and reduced life. The rim area of a rotating turbine disk, where the spacer arms extend from the disk, is subjected to exceptionally high stresses. The stresses include tension stresses in the circumferential and radial direction and causes life limiting low cycle fatigue at the corners. The primary function of the disks is to support the dead load of the blades. The large radial load imparted the disk rim by the blades plus the rotational speed and temperature gradient in the disk determines the overall disk geometry. Current LPT disk web thicknesses may be as small as about 0.1" thick while some LPT disks has webs sizes of 0.060" and were subjected to manufacturing induced "oil canning" problems plus operational blade-disk vibrations as well as low cycle thermal fatigue. The disks are bolted together at flanges located away from the disk web at the ends of the spacer arms. Locating the bolt holes away from the structural portion of the disk avoids potential stress concentrations in this region. Stresses are concentrated at the annular corners which behave as stress risers.

It is expensive to refurbish and/or replace disks and other rotor components in a gas turbine engine and, therefore, any means to enhance the rotor capability and, in particular, to extend aircraft engine component life is very desirable. The present solution to the problem of extending the life of these aircraft engine components is to redesign and design adequate margins by reducing stress levels to account for stress concentration features or stress risers. This is typically done by increasing thicknesses locally, thus, adding unwanted weight to the rotor. In order to ensure safe and reliable operation of older engines for extended service life, expensive redesign efforts or frequent replacement of suspect parts are required. This is expensive and obviously reduces customer satisfaction.

Laser peening, as understood in the art and as used herein, means utilizing a laser beam from a laser beam source to produce a strong localized compressive force on a portion of a surface. Laser peening has been utilized to create a compressive stressed protection layer at the outer surface of a workpiece without surface damage which is known to considerably increase the resistance of the workpiece to fatigue failure as disclosed in U.S. Pat. No. 4,937,421, entitled "Laser Peening System and Method".

Laser shock peening has been developed to design and construct longer lasting rotor components better able to resist both low and high cycle fatigue than present rotor components by imparting deep compressive residual stresses in localized regions of various parts of gas turbine engines such as disclosed in U.S. Pat. No. 5,492,447, entitled "Laser Shock Peened Rotor Components for Turbomachinery", assigned to the present Assignee. Particular attention is paid to regions in thick components subject to tensile stress fields subject and have stress risers which cause and/or experience concentrated stresses. The "pre-strained" laser shock peening process of the present invention is designed to provide improved laser shock peening by producing deeper and stronger compressive residual stresses in localized regions of a metallic workpiece by prestraining or loading the localized regions in compression or tension during the LSP process.

SUMMARY OF THE INVENTION

A method of laser shock peening an article provides loading the article such that a portion of the article to be laser shock peened is placed in a pre-strained or loaded condition and while the portion is in the loaded condition it is laser shock peened using a laser to fire a laser beam with sufficient power to vaporize material on a laser shock peening surface, of the portion of the article to form a region in the portion having deep compressive residual stresses. The deep compressive residual stresses imparted by the laser shock peening process extend into the article from the laser shock peened surface. The loaded condition may be either in compression or preferably tension, depending on the particular application. The term "loaded condition" is defined for the purpose of this Patent as being pre-strained in either compression or tension.

One more particular embodiment of the present invention provides for the article to be continuously moved while firing the laser beam to produce at least one row of overlapping circular laser beam spots having substantially equally spaced apart aligned center points or to produce adjacent rows of overlapping circular laser beam spots having generally equally spaced apart linearly aligned center points wherein adjacent rows of spots overlap.

The portion may be a corner of the article either linear, curved, or annular in shape. The article may be a gas turbine engine disk with an annular corner located between an annular web and an annular arm which extends away from the web. The arm being located between a rim at an outer radial end of the web and a hub at an inner radial end of the web. The disk may be continuously moved by rotating it about an axis of the hub while continuously firing a stationary laser beam on the annular corner laser shock peening surface. The axis may be tilted to different angles to produce adjacent rows of overlapping circular laser beam spots having generally equally spaced apart linearly aligned center points wherein adjacent rows of spots overlap. A curtain of water may be flowed over the laser shock peening surface while the laser beam is being fired.

The laser shock peening surface may be coated with paint or tape prior to the laser firing or it may be bare. The laser beam may be fired wet or dry, meaning with or without flowing a curtain of water or other fluid over the surface upon which the laser beam is firing. If fired dry then another material must be used to provide a clear confining medium over an ablative medium which provides the material to explosively form the plasma. In one particular method the article is continuously moved while a stationary laser beam is continuously fired and repeatably pulses between relatively constant periods producing lines, linear or curvilinear of overlapping laser hit spots on a portion of the article.

The laser beam may be fired and the article moved so that the center points of adjacent spots in adjacent rows are also offset from each other a generally equal amount in a direction along a line on which the center points are linearly aligned. These steps may be repeated using fresh tape or paint on each sequence of laser firings such that not two adjacent spots are hit on the same sequence of firings.

ADVANTAGES

Advantages provided by the present invention include improved ability to extend the useful life of metallic articles, such as in gas turbine engine components including disks having annular corners, as compared to currently available methods. The present invention provides a more effective method of laser shock peening which provides deeper and higher levels of compressive stresses in the laser shock peened regions, thereby providing the article with better structural integrity and resistance to high cycle and low cycle fatigue.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
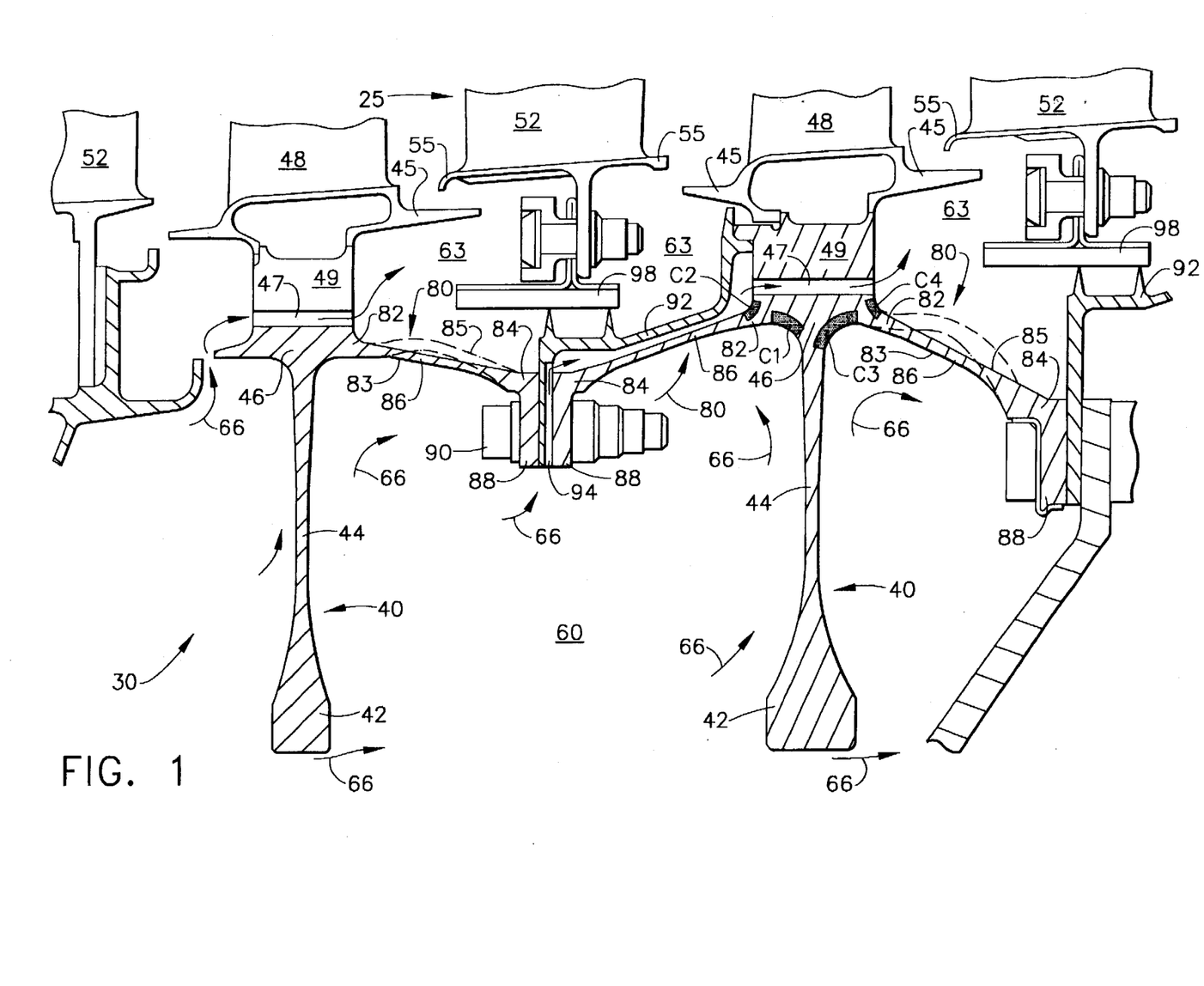
FIG. 1 is a longitudinal cross-sectional schematic illustration of a gas turbine engine having a turbine disk laser shock peened in accordance with the present invention.

Illustrated in FIG. 1 is a portion of a low pressure turbine (LPT) 30 of a gas turbine engine which includes a plurality of rotor disks 40 which is typically supported from a LPT turbine shaft (not shown). Each rotor disk 40 can include a hub 42 extending radially inwardly into a bore cooling cavity 60. A web 44 extends radially outwardly from the hub 42 to a rim 46 extending which defines the perimeter of the rotor disk 40. Adjacent rotor disks 40 are interconnected by structural disk spacer arms 80, which support adjacent rotor disks and transmit axial thrust loads imparted to the disks due to the expansion of a hot working gas flow 25 through the LPT. Adjacent rotor disks 40 are interconnected by structural disk spacer arms 80 which are integrally formed as one piece with or rigidly bonded to the rim 46 or hub 42 and transmit bending moments between adjacent disks.

Each rotor disk 40 supports a row of blades 48, each blade 48 including a dovetail-shaped root portion 49 supported in a dovetail slot 47 in disk rim 46, all in a manner well known in the art. Stationary rows of vanes 52 extend radially inwardly from a case (not shown) intermediate the rows of rotating blades 48. LPT rotor disks 40 can be cooled by air bled from an upstream compressor. Cooling air 66 is directed into the cavity 60 and bathes the disk hubs 42 and also cools the disk rims 46 and radially inboard inner surfaces 83 of the spacer arms 80. Annular seal cavities 63 extend circumferentially intermediate flow 25 and spacer arms 80. A portion of cooling air 66 can also be directed as by dovetail slots 47 to flow beneath blade roots 49, thereby cooling the disk rims and purging, to some extent, the cavities 63 to reduce ingestion of high temperature gas flow 25 into the circumferentially extending seal cavities 63. Cavities 63 may be bounded radially outwardly by axially and circumferentially extending blade platforms 45 and vane platforms 55, and bounded radially inwardly by radially outboard outer surface 85 on spacer arms 80. Seal cavities 63 are in fluid communication with gas flow 25 through the gap between adjacent rotating blade and stationary vane platforms 45 and 55, respectively. Seal cavities 63 can act as annular buffer cavities intermediate high temperature gas flow 25 and spacer arms 80.

A circumferentially extending seal land 98 bolted to the underside of vane platforms 55 faces rotating seal teeth on circumferentially extending rotating shield 92 to restrict the flow of gases 25 inward of the platforms 45 and 55. Shield 92 can be bolted intermediate adjacent disk spacer arms at a bolted connection 90. Shield 92 can include circumferentially spaced radial passages 94 for directing cooling air between shield 92 and the spacer arm 80, and into dovetail slots 47.

Each spacer arm 80 can include a first spacer arm end 82 integral with an adjacent disk rim 46, a second spacer arm end 84 which can include a radially inwardly extending connecting flange 88, and a circumferentially continuous spacer arm body section 86 extending intermediate the first and second ends. Body section 86 can include a radially inboard inner surface 83 and a radially outboard outer surface 85.

Under engine operating conditions thermal gradients in spacer arms 80 can cause the spacer arms to distort by bowing radially outwardly, as shown in phantom in FIG. 1. The disk 40 and flanges 88 act as heat sinks, so that the central portion of the spacer arm body section 86 will be at a higher temperature than the spacer arm first and second ends 82 and 84. The resulting spacer arm distortion is detrimental. The spacer arm is a structural component that can transmit both forces and bending moments between adjacent disks, and thermal distortion of the spacer arm can result in bending stresses in the spacer arm, which are reacted at the disk rim 46. inner and outer and forward and aft annular corners C1, C2, C3 and C4, respectively between the spacer arms 80 and the web 44 at the rim 46 act as stress risers where the stresses are concentrated as they are reacted out.

Figure 2:
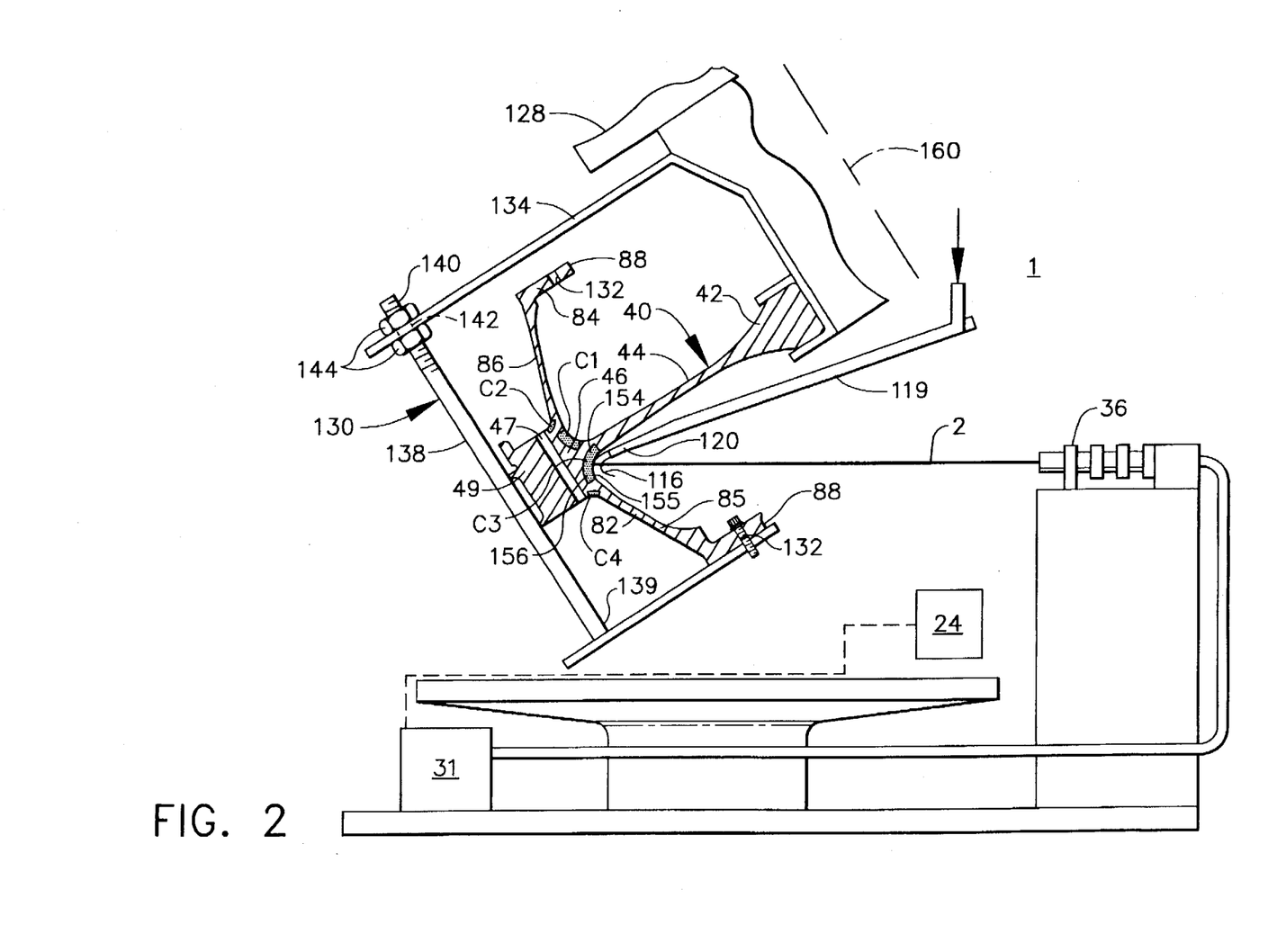
FIG. 2 is a cross-sectional illustration of the turbine disk in FIG. 1 mounted and being processed in a laser shock peening system in accordance with the method of the present invention.
Figure 3:
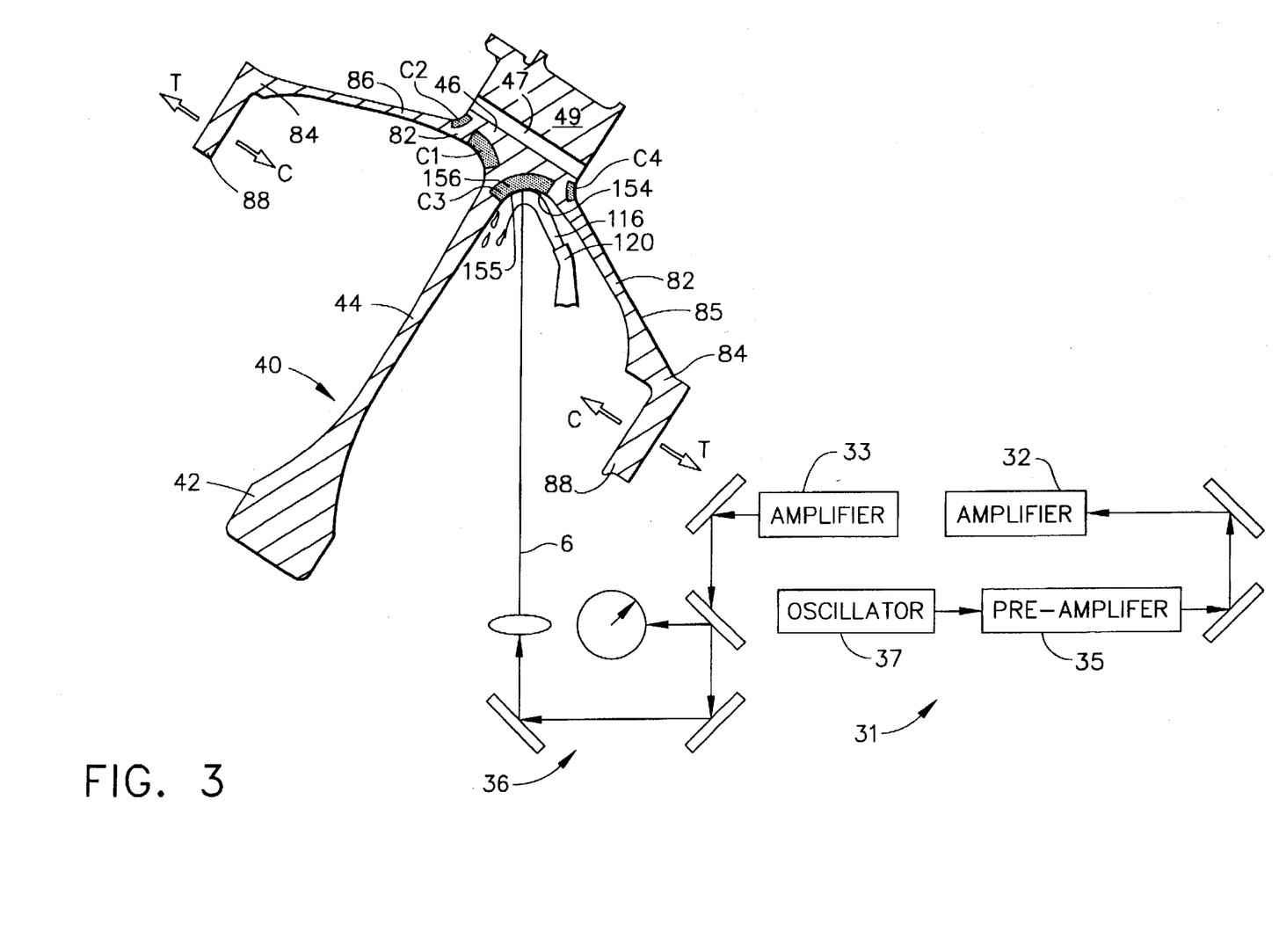
FIG. 3 is a partial cross-sectional and a partial schematic view of the setup in FIG. 2.

To counter fatigue failure at the annular corners C1, C2, C3 and C4, respectively, these corners have laser shock peening surfaces 154 and pre-stressed regions 156 having deep compressive residual stresses imparted by laser shock peening (LSP) extending into the rim 46 from the laser shock peened surfaces as seen in FIGS. 2 and 3. Note, that the laser shock peening surfaces 154 and the pre-stressed regions 156 are both curved annularly around the disk annular corners in a geometric saddle-like shape. The present invention is a method of laser shock peening the annular corners C1, C2, C3 and C4, respectively, while the regions 156 are in a pre-strained or loaded condition, either in compression C or preferably in tension T. The disk 40 is preferably mounted on a positionable and rotatable machine fixture 128 used to move, position and rotate the disk about a machine axis 160, which coincides with an axis of rotation of the disk 40, to laser shock peen, preferably "on the fly" in accordance with a laser shock peening method and apparatus 1 of the present invention. A pre-straining or loading apparatus 130 includes fixturing elements which attach to the connecting flanges 88 through bolt holes 132. A radially extending upper fixturing element 134 is mounted to the disk 40 and supports a plurality of circumferentially disposed axially extending adjustable rods 138 which have a radially extending lower fixturing element 132 cantilevered off first ends 139 and which is bolted to one of the connecting flanges 88 through bolt hole 132. The axially extending adjustable rods 138 are threaded at second ends 140, disposed through apertures 142 in the upper fixturing element 134, and may be adjusted to place the corners C3 and C4 in a loaded condition of either tension T or compression C by suitably adjusting nuts 144 which are threaded on second ends 140 with the upper fixturing element 134 sandwiched inbetween. Many types loading means may be used to place the corners in either tension or compression.

Illustrated in FIGS. 2 and 3 is the disk 40 mounted on the rotatable fixture 128 that can be used to move and position the blade to effect laser shock peening "on the fly" in accordance with a laser shock peening method and apparatus 1 of the present invention. Laser shock peening on the fly both with and without a painted ablative coating is disclosed in U.S. patent application Ser. No. 08/362,362, and laser shock peening using a tape ablative coating is disclosed with a water curtain in U.S. Pat. No. 5,674,329, and without a water curtain in U.S. Pat No. 5,674,328.

The invention is illustrated for use in laser shock peening the annular corners of the disk 40, but may be used in any laser shock peening process. The laser shock peening surface 154 may be bare or covered by a coating 159 such as a layer of an adhesive tape or paint to form a coated surface 155 and a water curtain 116 may be flowed over the bare laser shock peening surface 154 or the coated surface 155 by a water nozzle 120 at the end of a water supply tube 119. The laser shock peening surfaces 154 may be adhesively covered with at least one thick tape lap or two or more thinner laps of tape without a clear confinement layer to provide the laser shock peening coated surface 155. The tape represents a type of the coating 159 of the laser shock peening surface 154 for the purposes of this patent just as does the paint. The water curtain 116 may be flowed over the painted or taped surface particularly if the taped surface has no clear confining layer. If a sequence of firings are used so that virgin coating on the surface is ablated then the laser shock peening surfaces 154 is painted or taped before each sequence of the laser firing and laser shock peening. The tape may include an ablative medium layer and a confinement layer as well as, preferably, an adhesive layer. The clear confining layer may replace the water curtain 116 flowed over the laser shock peening surface 154.

A tape without an adhesive layer may also be used with a suitable adhesive material applied directly to the laser shock peening surface 154. Suggested materials for the ablative confinement layers include plastic, such as vinyl plastic film, wherein the ablative medium may be pigmented black and the confinement layer pigmented clear. The tape should be rubbed or otherwise pressed against the shock peening surface 154 to remove bubbles that may remain between the tape and the laser shock peening surface. The water curtain 116 may be flowed over the bare shock peening surface 154 or coated surface 155 particularly. Suggested materials for the ablative layer include plastic such as vinyl plastic film. One suitable source for the tape without a clear confining layer is SCOTCH BRAND NO. 471 PLASTIC FILM TAPE which can be had with a black pigmented vinyl plastic backing, about 4 mils thick, and has a rubber adhesive layer, about 1 mil thick.

The laser shock peening apparatus 1 illustrated herein includes a laser beam apparatus including a generator 31 having an oscillator 37 and a pre-amplifier 35 which feeds the laser beam 2 into an optical transmission circuit having a first and second amplifier 32 and 33, respectively, and optics 36 which include optical elements that transmit and focus the laser beam 2 on the laser shock peening coated surface 155. The controller 24 may be used to modulate and fire the laser beam apparatus to fire the laser beam 2 on the laser shock peening coated surface 155 in a controlled manner.

The laser beam shock induced deep compressive residual stresses in the compressive pre-stressed regions 156 are generally about 150—150 KPSI (Kilo Pounds per Square inch) extending from the laser shock peening surfaces 154 to a depth of about 20–50 mils into laser shock induced compressive residually stressed regions 156. The laser beam shock induced deep compressive residual stresses are produced by repetitively firing a high energy laser beam 2 that is defocused ± a few mils with respect to the laser shock peening coated surface 155. The laser beam 2 typically has a peak power density on the order of magnitude of a gigawatt/cm$^2$ and is fired without the use of a curtain of flowing water that is flowed over the coated surface 155 in the prior art. The ablative medium is ablated generating plasma which results in shock waves on the surface of the material. These shock waves are redirected towards the coated surface 155 by the clear confinement layer or alternatively by the combined thickness of the multiple tape laps in the embodiment illustrated in FIG. 3 to generate travelling shock waves (pressure waves) in the material below the taped surface. The amplitude and quantity of these shockwave determine the depth and intensity of compressive stresses. The tape is used to protect the target surface, generate plasma, and confine the explosion and direct the shockwave to the laser shock peening surface 154.

The laser may be fired sequentially "on the fly", as illustrated in FIGS. 2–5, so that the bare laser shock peening surface 154 or coated surface 155 is laser shock peened with more than one sequence of firings on the laser shock peening surface. The preferred embodiment of the method of the present invention includes continuously moving the disk while continuously firing the laser beam on the taped surface such that adjacent laser shock peened circular spots are hit in different sequences. However, the laser beam may be moved instead just so long as relative movement between the beam and the surface is effected.

Figure 4:
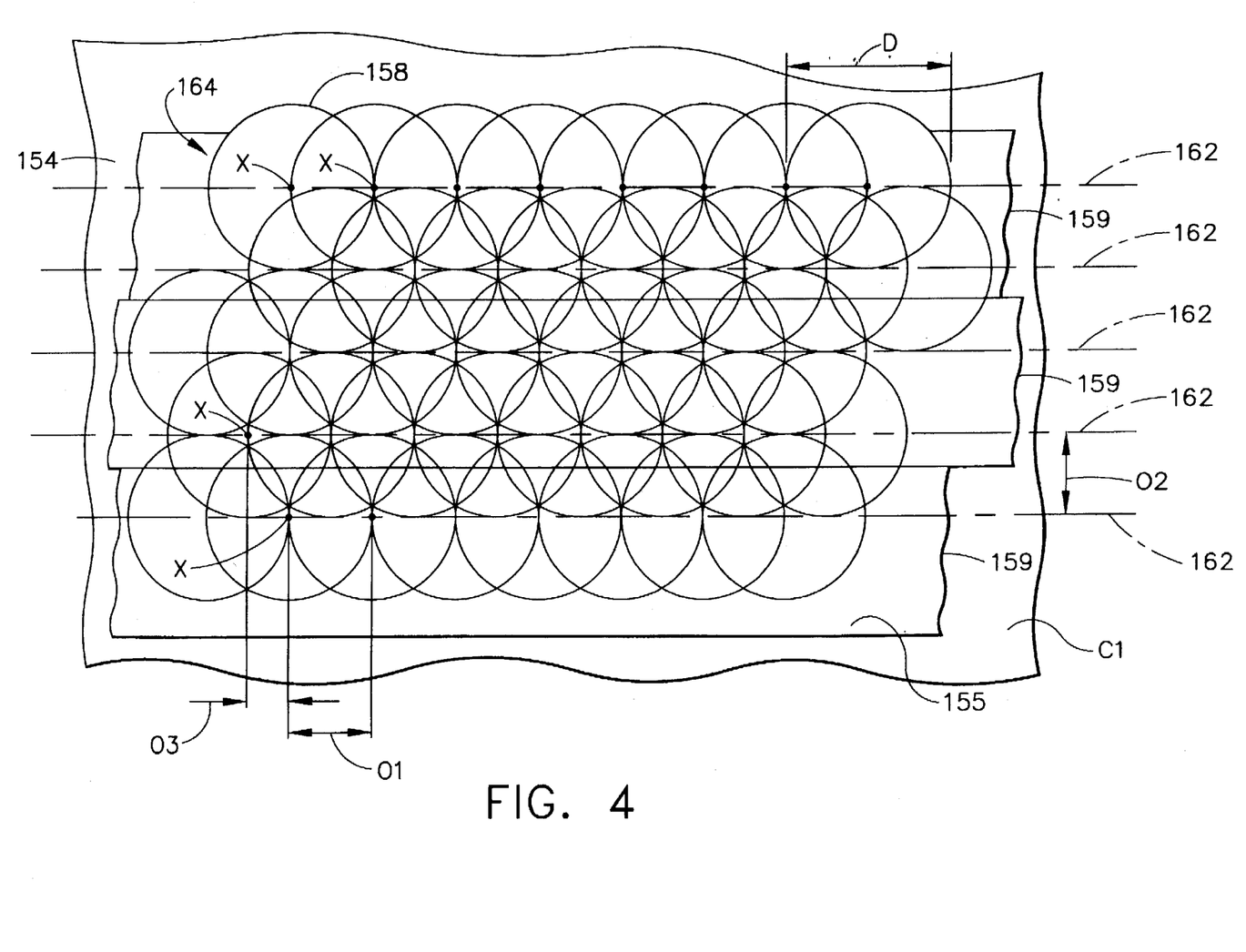
FIG. 4 is a rolled out schematic illustration of a laser shock peening surface having a first pattern of laser shocked peened circular spots on a laser shock peening coated surface in an annular corner of the disk in FIG. 2.
Figure 5:
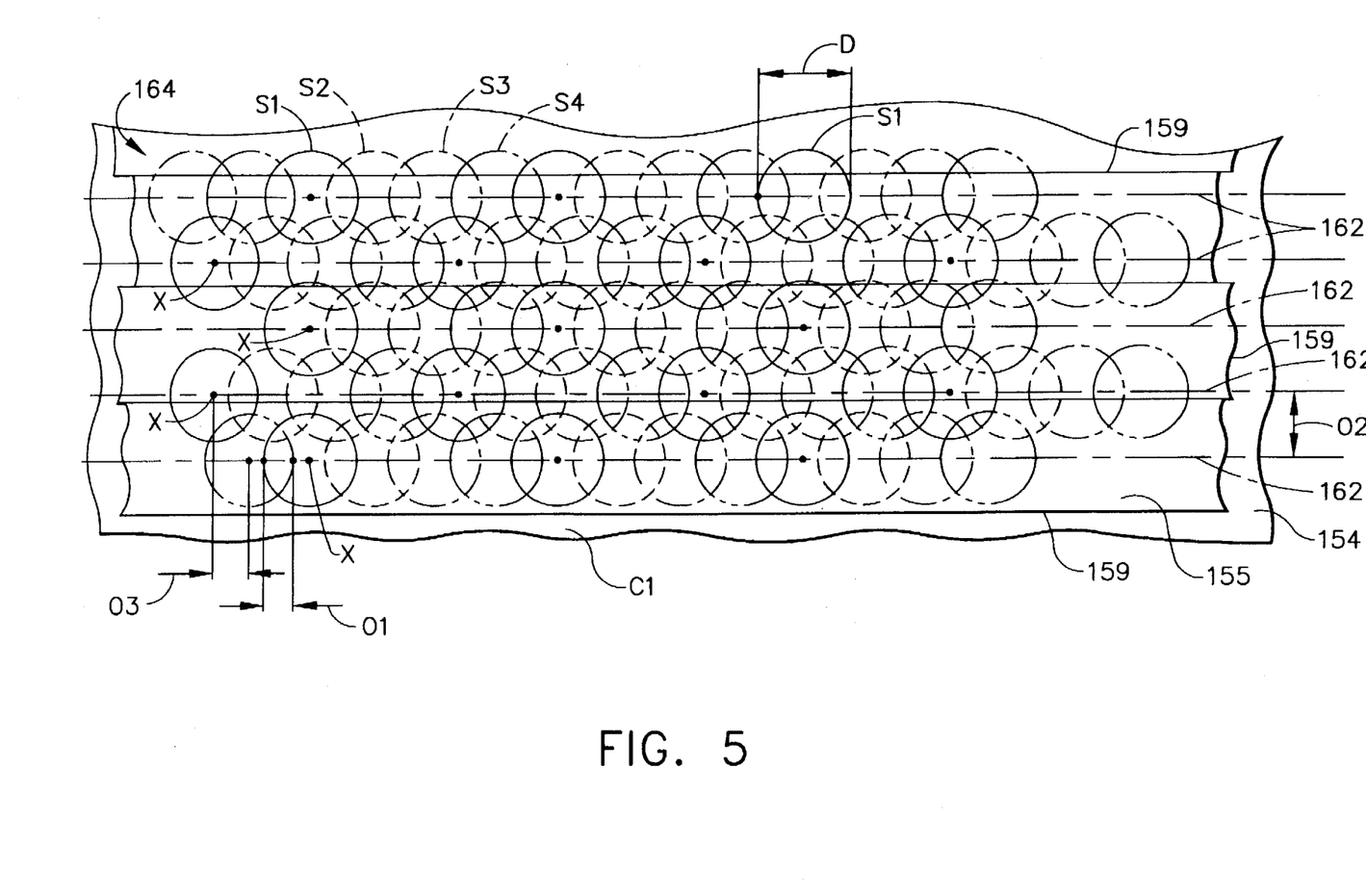
FIG. 5 is a rolled out schematic illustration of a laser shock peening surface having a second pattern of laser shocked peened circular spots on a laser shock peening coated surface in an annular corner of the disk in FIG. 2.

FIGS. 4 and 5 illustrates a pattern of laser shocked peened circular spots 158 (indicated by the circles) of four such sequences S1 through S4. The S1 sequence is shown as full line circles, as opposed to dotted line circles of the other sequences, to illustrate the feature of having non-adjacent laser shocked peened circular spots 158 with their corresponding centers X along a row centerline 162. The pattern of sequences entirely covers the laser shock peening coated surface 155. The laser shocked peened circular spots 158 have a diameter D in a row 164 of overlapping laser shock peened circular spots. The pattern may be of multiple overlapping rows 164 of overlapping shock peened circular spots on the laser shock peening coated surface 155. A first overlap is between adjacent laser shock peened circular spots 158 in a given row and is generally defined by a first offset O1 between centers X of the adjacent laser shock peened circular spots 158 and can vary from about 30%–50% or more of the diameter D. A second overlap is between adjacent laser shock peened circular spots 158 in adjacent rows and is generally defined by a second offset O2 between adjacent row centerlines 162 and can vary from about 30%–50% of the diameter D depending on applications and the strength or fluency of the laser beam. A third overlap in the form of a linear offset O3 between centers X of adjacent laser shock peened circular spots 158 in adjacent rows 164 and can vary from about 30%–50% of the diameter D depending on a particular application.

This method is designed so that only virgin or near virgin tape is ablated away without any appreciable effect or damage on the surface of the airfoil. This is to prevent even minor blemishes or remelt due to the laser which might otherwise cause unwanted aerodynamic effects on the disk's operation. Several sequences may be required to cover the entire pattern and re-taping of the laser shock peening surfaces 154 is done between each sequence of laser firings. The laser firing each sequence has multiple laser firings or pulses with a period between firings that is often referred to as a "rap". During the rap, the part is moved so that the next pulse occurs at the location of the next laser shocked peened circular spot 158. Preferably, the part is moved continuously and timed to be at the appropriate location at the pulse or firing of the laser beam. One or more repeats of each sequence may be used to hit each laser shocked peened circular spot 158 more than once. This may also allow for less laser power to be used in each firing or laser pulse.

The process may be used to laser shock peen the coated surface 155 using five rows of laser shock peened spots and covering the entire area of the laser shock peened surfaces 154 in four sequences designated S1, S2, S3 and S4. The laser shock penning process starts with the first sequence where every four spots is laser shock peened on sequence 1 while the disk is continuously moved and the laser beam is continuously fired or pulsed and the laser. The part is timed to move between adjacent laser shock peened spots in the given sequence such as S1. The timing coincides with the rep between the pulses of the continuous laser firing on the disk. All five rows of the overlapping laser shocked peened circular spots 158 contain spots of each sequence spaced apart a distance so that other laser shock peened circular spots of the same sequence don't effect the tape around it. Sequence 1, preceded by a first taping, is shown by the complete or full circles in the FIG. 4 while the other laser shock peened spots such as in sequence S2, S3 and S4 are illustrated as dotted line, single dashed line, and double dashed line circles, respectively. Before the next sequence, such as between sequence S1 and sequence S2, the entire area of the laser shock peening surface 154 to be laser shock peened is re-taped. This procedure of re-taping avoids any of the bare metal of the laser shock peening surface from being hit directly with the laser beam. For an area coverage of five rows with the spacing between rows and between adjacent spots of about 30%, it is found that one coating, either tape or paint and three re-coatings will be necessary so that the part is actually coated four times in total. It has been found desirable to laser shock peen a given part, such as a disk corner, with between two and five rows. It has also been found desirable to laser shock peen each spot 158 up to 3 or more times. If each spot 158 is hit 3 times then 1 coating and 11 re-coatings is required for three sets of sequences S1–S4 for a total of 12 coatings. Note, that the laser shock peening surface 154 my be laser shock peened bare without any coating, preferably, with the use of the water curtain. Bare laser shock peening would eliminate the need for coatings and re-coatings.

Though the exemplary embodiment of the present invention is illustrated for a gas turbine engine rotor component such a disk and, more particularly, a turbine disk suitable for use in a hot section of a gas turbine engine other metallic articles may be fashioned in the same manner. The invention may be used for new or refurbished parts to restore dimensions of the component and, in particular, radial dimensions.

The compressive pre-stressed regions 156 is formed by multiple overlapping laser hits indicated by the overlapping laser shocked peened circular spots 158 on laser shock peening surface 154. The laser beam shock induced deep compressive residual stresses in the compressive pre-stressed regions 156 are generally about 50–150 KPSI (Kilo Pounds per Square Inch) extending from the laser shocked peened surfaces 154 to a depth of about 20–50 mils into laser shock induced compressive residually pre-stressed regions 156. The laser beam shock induced deep compressive residual stresses are produced by repetitively firing a high energy laser beam that is focused a few mils above or below the laser shock peened surface 154 which is covered with a paint to create peak power densities having an order of magnitude of a gigawatt/cm$^2$. The laser beam is fired through a curtain of flowing water that is flowed over the laser shock peened surface 154 such that the paint is ablated, thereby, generating a plasma which results in shock waves on the surface of the material. These shock waves are re-directed towards the painted surface by the curtain of flowing water to generate travelling shock waves (pressure waves) in the material below the painted surface. The amplitude and quantity of these shockwave determine the depth and intensity of compressive stresses. The paint is used to protect the target surface and also to generate plasma. Ablated paint material is washed out by the curtain of flowing water.

This and other methods for laser shock peening are disclosed in greater detail in U.S. Pat. No. 5,492,447, entitled "LASER SHOCK PEENED ROTOR COMPONENTS FOR TURBOMACHINERY", and in U.S. patent Ser. No. 08/362,362, entitled "LASER SHOCK PEENING ON THE FLY", U.S. Pat. No. 5,591,009, entitled "LASER SHOCK PEENED GAS TURBINE ENGINE FAN BLADE EDGES", and U.S. patent Ser. No. 08,399,285, entitled "LASER SHOCK PEENED GAS TURBINE ENGINE COMPRESSOR BLADE EDGES", filed December, 1994, all of which are incorporated herein by reference.

The present invention has been illustrated in detail in the form of a turbine disk, but is applicable to other turbine rotor components such as shafts, seals, and spools. While the preferred embodiment of the present invention has been described fully in order to explain its principles, it is understood that various modifications or alterations may be made to the preferred embodiment without departing from the scope of the invention as set forth in the appended claims.

We claim:

1. A method of laser shock peening an article, said method comprising the following steps:

loading the article such that a portion of the article to be laser shock peened is placed in a loaded condition, said loaded condition is one of two loaded conditions, said two consisting of tension and compression;

while the article portion is in said loaded condition, using a laser to fire a laser beam with sufficient power to vaporize material on a laser shock peening surface of said portion of the article with the laser beam to form a region in said portion having deep compressive residual stresses imparted by the laser shock peening process extending into the article from the laser shock peened surface.

2. A method as claimed in claim wherein the article is continuously moved while firing the laser beam to produce at least one row of overlapping circular laser beam spots having substantially equally spaced apart aligned center points.

3. A method as claimed in claim 2 wherein the article is moved and the laser beam is fired to produce adjacent rows of overlapping circular laser beam spots having substantially equally spaced apart linearly aligned center points wherein adjacent rows of spots overlap.

4. A method as claimed in claims 2 wherein said portion is a corner of the article.

5. A method as claimed in claim 4 wherein said corner is an annular corner.

6. A method as claimed in claim 5 wherein the article is a gas turbine engine disk and said annular corner is located between an annular web and an annular arm which extends away from the web, the arm being located between a rim at an outer radial end of the web and a hub at an inner radial end of the web.

7. A method as claimed in claim 6 wherein the disk is rotated about an axis of the hub while continuously firing a stationary laser beam on the annular corner laser shock peening surface.

8. A method as claimed in claim 7 wherein the axis is tilted to produce adjacent rows of overlapping circular laser beam spots having substantially equally spaced apart linearly aligned center points wherein adjacent rows of spots overlap.

9. A method as claimed in claim 9 wherein a curtain of water is flowed over the laser shock peening surface while laser beam is being fired.

* * * * *